(12) United States Patent
Zhang et al.

(10) Patent No.: US 11,995,316 B2
(45) Date of Patent: May 28, 2024

(54) SYSTEMS AND METHODS FOR A REDUNDANT ARRAY OF INDEPENDENT DISKS (RAID) USING A DECODER IN CACHE COHERENT INTERCONNECT STORAGE DEVICES

(71) Applicant: Samsung Electronics Co., Ltd., Suwon-si (KR)

(72) Inventors: Tong Zhang, Mountain View, CA (US); Heekwon Park, San Jose, CA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 14 days.

(21) Appl. No.: 17/885,520

(22) Filed: Aug. 10, 2022

(65) Prior Publication Data

US 2023/0409196 A1  Dec. 21, 2023

Related U.S. Application Data

(60) Provisional application No. 63/352,630, filed on Jun. 15, 2022.

(51) Int. Cl.
*G06F 3/06* (2006.01)

(52) U.S. Cl.
CPC ............ *G06F 3/0604* (2013.01); *G06F 3/064* (2013.01); *G06F 3/0689* (2013.01)

(58) Field of Classification Search
CPC ............ G06F 12/0862; G06F 12/0868; G06F 12/0888; G06F 2212/502; G06F 3/0607;
(Continued)

(56) References Cited

U.S. PATENT DOCUMENTS 7,415,506 B2   8/2008  Gajar et al.
7,634,686 B2   12/2009 Sutardja
(Continued)

FOREIGN PATENT DOCUMENTS

CN   103049222 A   4/2013
CN   111538460 A   8/2020
(Continued)

OTHER PUBLICATIONS

McEwan, Alistair A., et al., "An Embedded FTL for SSD Raid," 2015 Euromicro Conference on Digital System Design, 2015, pp. 575-582.
(Continued)

*Primary Examiner* — Yong J Choe
(74) *Attorney, Agent, or Firm* — Renaissance IP Law Group LLP

(57) ABSTRACT

A system is disclosed. The system may include a processor that may issue a byte level protocol request including a byte address. The system may also include a first storage device and a second storage device. The first storage device and the second storage device may support a cache coherent interconnect protocol, the cache coherent interconnect protocol including a block level protocol and a byte level protocol. The first storage device and the second storage device are included in a redundant array of independent disks (RAID). The first storage device may include a first address range, and the second storage device may include a second address range. The second storage device may provide a RAID address range associated with the first address range and the second address range. A decoder associated with the second storage device may be configured to receive the request from the processor. The decoder may determine that the byte address in the RAID address range is associated with a target address range.

20 Claims, 11 Drawing Sheets

(58) Field of Classification Search
CPC ...... G06F 3/061; G06F 3/0656; G06F 3/0661;
G06F 3/067; G06F 3/0679; G06F 3/0688
See application file for complete search history.

(56) References Cited

U.S. PATENT DOCUMENTS

| | | |
|---|---|---|
| 7,694,072 B2 | 4/2010 | Nehse |
| 8,452,929 B2 | 5/2013 | Bennett |
| 8,954,654 B2 | 2/2015 | Yu et al. |
| 10,896,089 B2 | 1/2021 | Helmick et al. |
| 11,294,827 B2 | 4/2022 | Bennett et al. |
| 11,314,580 B2 | 4/2022 | Chawla et al. |
| 2013/0019057 A1 | 1/2013 | Stephens |
| 2019/0310913 A1 | 10/2019 | Helmick et al. |
| 2019/0310915 A1 | 10/2019 | Camp et al. |
| 2020/0034234 A1 | 1/2020 | Wu |
| 2020/0125503 A1 | 4/2020 | Graniello et al. |
| 2020/0151104 A1 | 5/2020 | Yang |
| 2020/0348866 A1 | 11/2020 | Gao et al. |
| 2020/0371700 A1 | 11/2020 | Stabrawa et al. |
| 2021/0073151 A1 | 3/2021 | Sen et al. |
| 2021/0081273 A1 | 3/2021 | Helmick et al. |
| 2021/0278998 A1 | 9/2021 | Li |
| 2021/0334201 A1 | 10/2021 | Bennett et al. |
| 2021/0374067 A1 | 12/2021 | Helmick et al. |
| 2022/0114086 A1 | 4/2022 | Clark et al. |

FOREIGN PATENT DOCUMENTS

| | | |
|---|---|---|
| CN | 112596673 A | 4/2021 |
| CN | 113687977 A | 11/2021 |
| CN | 113687978 A | 11/2021 |

OTHER PUBLICATIONS

Muppalaneni, Nitin, et al., "A Multi-Tier RAID Storage System with RAID1 and RAID5," Proceedings 14th International Parallel and Distributed Processing Symposium, IPDPS 2000, 2000, 9 pages.
Yao, Jie, et al., "Elastic-RAID: A New Architecture for Improved Availability of Parity-Based RAIDs by Elastic Mirroring," IEEE Transactions on Parallel and Distributed Systems, vol. 27, No. 4, Apr. 2016, pp. 1044-1056.
European Extended Search Report for Application No. 23176343.4, mailed Nov. 7, 2023.
European Extended Search Report for Application No. 23176718.7, mailed Nov. 8, 2023.
Wikipedia, "Compute Express Link," 2022, (https://web.archive.org/web/20220606115649/https://en.wikipedia.org/wiki/Compute_Express_Link), webpage accessed 2023, 6 pages.

SYSTEMS AND METHODS FOR A REDUNDANT ARRAY OF INDEPENDENT DISKS (RAID) USING A DECODER IN CACHE COHERENT INTERCONNECT STORAGE DEVICES

RELATED APPLICATION DATA

This application claims the benefit of U.S. Provisional Patent Application Ser. No. 63/352,630, filed Jun. 15, 2022, which is incorporated by reference herein for all purposes.

The application is related to U.S. patent application Ser. No. 17/885,519, filed Aug. 10, 2022, which claims the benefit of U.S. Provisional Patent Application Ser. No. 63/352,629, filed Jun. 15, 2022, both of which are incorporated by reference herein for all purposes.

FIELD

The disclosure relates generally to storage, and more particularly to supporting a Redundant Array of Independent Disks (RAID) using storage devices supporting a cache coherent interconnect protocol.

BACKGROUND

A Redundant Array of Independent Disks (RAID) may present a set of two or more storage devices as a single storage device. A RAID configuration may support striping (using the storage space of two or more storage devices as though they were a single storage device), parity (providing a mechanism to double check that data is correct), or both. But to utilize the benefits of RAID, access to the data may proceed through a RAID controller (either hardware or software). Bypassing the RAID controller might result in inaccurate data or data corruption.

A need remains for a way to improve access to data from a RAID configuration.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
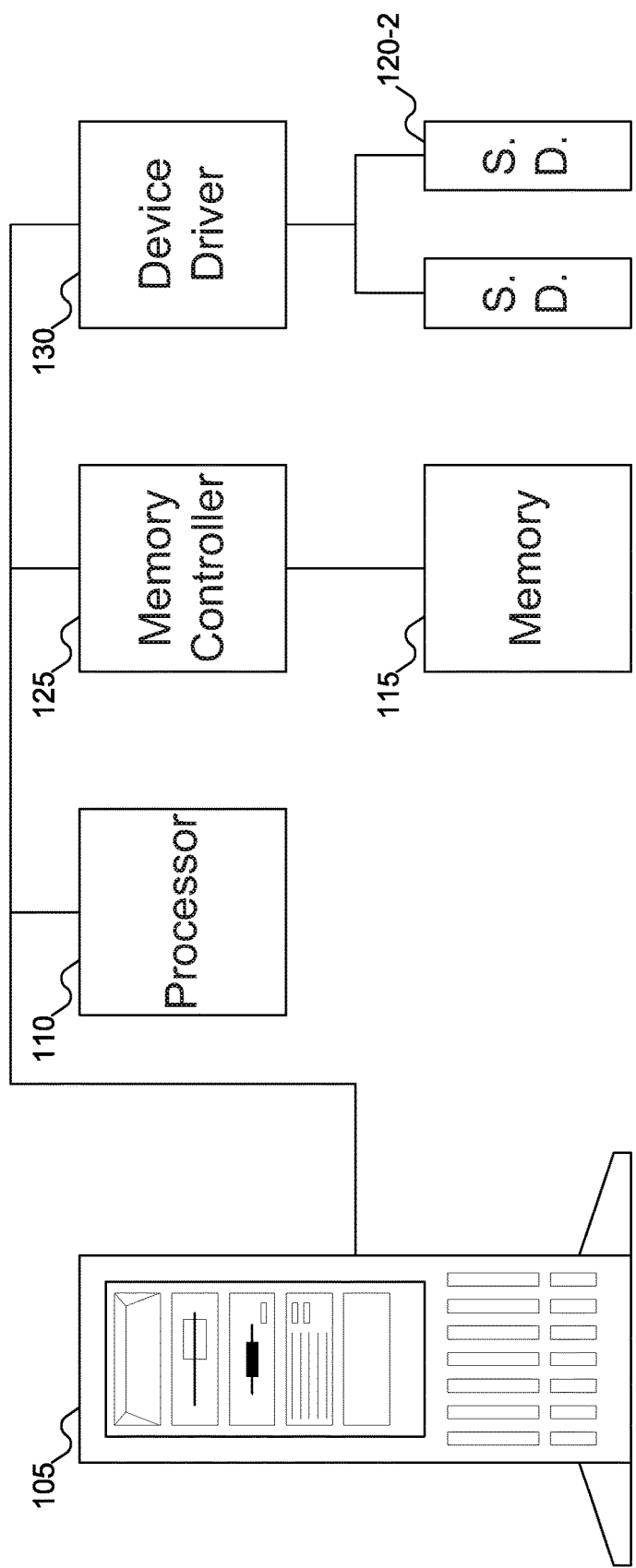
FIG. 1 shows a machine including cache coherent interconnect storage devices that may be configured into a redundant array of independent disks (RAID), according to embodiments of the disclosure.

Embodiments of the disclosure include a system. The system may include two or more storage devices that support a cache coherent interconnect protocol. A decoder in one of the storage devices may expose an address range for byte level protocol requests that may be issued to the storage devices while using a redundant array of independent disks (RAID) configuration, and may manage processing of the requests by the storage devices.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices supporting cache coherent interconnect protocols are becoming more common. Such storage devices permit access to data using different protocols, with different levels of granularity. Data may be accessed in blocks, like other storage devices, or in bytes, like memory devices.

A redundant array of independent disks (RAID) enables two or more disks to appear as one larger disk. Different levels of RAID may offer increased storage over individual devices, redundancy to protect against data loss due to a failure of a storage device, or both.

RAID technology was developed before storage devices with cache coherent interconnect protocols were introduced. RAID normally supports only block level access to storage devices. If an application were to use a byte level protocol to access data on a storage device, such an access may bypass RAID technology.

But for some RAID levels, such as RAID level 0 (striping) and RAID level 1 (mirroring), it may be possible to manage byte level access to data. Embodiments of the disclosure leverage this capability using a host-managed device memory (HDM) decoder. For RAID level 0 configurations, one storage device may expose memory that may span both storage devices. The HDM decoder may determine whether a particular address is on that storage device or another storage device, and direct the request accordingly. Which storage device includes a particular address may be a function of, for example, the size of a stripe and/or the size of a block on the storage devices.

For RAID level 1 configurations, a first storage device may expose memory. That storage device may act as the main storage device in the mirror. The HDM decoder may broadcast writes to the secondary storage devices, and may perform round robin reads from the storage devices in the mirror. RAID level 1 configurations may offer increased data integrity.

FIG. 1 shows a machine including cache coherent interconnect storage devices that may be configured into a redundant array of independent disks (RAID), according to embodiments of the disclosure. In FIG. 1, machine 105, which may also be termed a host or a system, may include processor 110, memory 115, and storage devices 120-1 and 120-2 (which may be referred to collectively as storage devices 120). Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

In some embodiments of the disclosure, machine 105 may include a persistent memory device (not shown in FIG. 1). This persistent memory device may be used in place of, or in addition to, memory 115.

Processor 110 and memory 115 may also support an operating system under which various applications may be running. These applications may issue requests (which may also be termed commands) to read data from or write data to either memory 115. When storage device 120-1 and/or storage device 120-2 (which may be referred to collectively as storage devices 120) are used to support applications reading or writing data via some sort of file system, storage devices 120 may be accessed using device driver 130. While FIG. 1 shows two storage devices 120-1 and 120-2, there may be any number of storage devices in machine 105 (although if there is only one storage device 120, a RAID configuration is generally not used). Storage devices 120 may each support any desired protocol or protocols, including, for example, the Non-Volatile Memory Express (NVMe) protocol. Different storage devices 120 may support different protocols and/or interfaces. In particular, storage devices 120 may support a cache coherent interconnect protocol, which may support both block level (or any other higher level of granularity) access and byte level (or any other lower level of granularity) access to data on storage devices 120. An example of such a cache coherent interconnect protocol is the Compute Express Link (CXL) protocol, which supports accessing data in blocks using the cxl.io protocol and accessing data in bytes using the cxl.mem protocol.

FIG. 1 uses the generic term "storage device", and embodiments of the disclosure may include any storage device formats that may support cache coherent interconnect protocols, examples of which may include hard disk drives and Solid State Drives (SSDs). Any reference to "SSD", "hard disk drive", or "storage device" below should be understood to include such other embodiments of the disclosure. Further, different types of storage devices may be mixed. For example, one storage device 120 might be a hard disk drive, and another storage device 120 might be an SSD.

As mentioned above, storage devices 120 may be configured into a RAID. When RAID is used, the underlying hardware—storage devices 120—may be hidden from processor 110. Instead, the RAID configuration shows a "virtual" device that looks like a single storage device, but including storage across the various storage devices 120 that are included in the RAID configuration. (Some storage devices 120 may be part of the RAID and others not: storage devices 120 that are not included in the RAID may be accessed using device driver 130 and conventional access techniques.)

There are a number of different ways to use RAID. These different ways are known as "levels", with different numbers representing the different ways in which storage devices 120 are used. RAID level 0, also known as a stripe set or striped volume, does not actually provide for any redundancy. Instead, data is written across storage devices 120. In embodiments of the disclosure with two storage devices, half of the data is written to storage device 120-1, and half of the data is written to storage device 120-2. The total available storage in a RAID level 0 is typically equal to the size of the smallest storage device multiplied by the number of storage devices in the RAID: mixing storage devices of different sizes may result in some storage not being accessible due to how RAID level 0 operates. RAID level 0 improves performance: since each storage device 120 writes and reads only a portion of the data, each storage device 120 may access its portion in parallel with other storage devices 120 in the RAID, resulting in faster reads and/or writes. But because the data is split across multiple storage devices, the failure of any individual storage device in the system might result in the loss of all data stored.

RAID level 1, also known as mirroring, stores the same data on multiple storage devices. That is, the data stored on storage device 120-1 is also stored on storage device 120-2, and vice versa. The total available space in a RAID level 1 is typically the size of the smallest storage device: including other storage devices in the RAID does not increase the available storage capacity (since the other storage devices are mirrors). Read performance may be improved, since the data may be read from the various storage devices in the RAID. But since write requests result in all the data being written to each storage device, write performance may be unchanged. By keeping two (or more) copies of the data, redundancy is provided. Should any individual storage device 120 fail, the data may be accessed from any other storage device 120 in the RAID.

RAID level 5 offers block-level striping with distributed parity. That is, when data is to be written to a stripe across storage devices 120, the data is written to all but one storage device 120: the last storage device 120 stores parity data based on the data stored on the other storage devices for that stripe. No individual storage device 120 is dedicated to store parity data: parity data may be rotated across all storage devices 120. (Having one storage device 120 be dedicated to storing the parity data is RAID level 4.) RAID level 5 uses at least three storage devices 120: the total available storage is typically the size of the smallest storage device multiplied by one less than the total number of storage devices in the RAID. So, for example, if the RAID includes three 500 GB storage devices, the total available storage space is approximately (3−1)×500 GB=1000 GB=1 TB. Read performance may be improved, since the data may be read from the various storage devices in the RAID (other than the storage device storing the parity information for a stripe). Write performance also may be improved, as data may be written across storage devices 120. However, since the parity information may be generated from data written to other storage devices 120, some additional time may be needed to generated the parity information. In the event that one storage device fails, the lost data may be recalculated using the data from the other storage devices (as the parity information may be used to reconstruct the data from the failed storage device).

RAID level 6 is similar to RAID level 5, except that parity information is stored on two storage devices in the RAID. As such, RAID level 6 uses at least four storage devices, but RAID level 6 may tolerate the failure of two storage devices 120 in the RAID. Total available storage is typically the size of the smallest storage device multiplied by two less than the total number of storage devices in the RAID. So, for example, if the RAID includes four 500 GB storage devices, the total available storage space is approximately (4−1)×500 GB=1000 GB=1 TB. Read and write performance may be similar to RAID level 5.

RAID levels 0, 1, 5, and 6 are among the more common RAID levels, but other RAID levels also exist. In addition, it may be possible to configure storage devices 120 into combinations of these levels. For example, RAID level 10 is a stripe of mirrors. That is, sets of storage devices may be arranged in a RAID level 1 configuration, with a RAID level 0 stripe including the various sets of mirrors. RAID level 10 offers benefits of both mirroring and striping, but at the cost of needing additional storage devices: for example, RAID level 10 uses at least four storage devices, with total capacity being only the size of the smallest storage device multiplied by the number of sets of mirrors used in the stripe.

For purposes of this disclosure, the term "parity information" should be understood as including any form of redundancy of information for the RAID, whether as parity information (as may be used, for example, in RAID levels 5 or 6) or a mirror of data (as may be used, for example, in RAID level 1).

Some RAID implementations may offer the ability to add additional storage devices to the RAID. But whether an additional storage device increases the total available storage may depend on the RAID level being used. For example, adding another storage device to a RAID level 0 may increase storage capacity (but still not offer redundancy), whereas adding another storage device to a RAID level 1 may increase redundancy but not increase the total storage capacity. Adding an additional storage device to RAID levels 5 or 6 may increase the total available storage to some extent. Whether a new storage device may be added to a RAID without shutting down the RAID to add the new storage device may depend on the RAID implementation.

RAID may be implemented using either hardware or software. A hardware RAID implementation may include hardware specifically designed to support using storage devices 120 in a RAID configuration. A software RAID implementation may achieve a similar outcome using software. Hardware RAID implementations typically offer more options (such as additional RAID levels) and faster implementation of RAID functions than software RAID implementations, and may avoid potential negative impacts to processor 110, but may be more expensive to implement. In the remainder of this document, the focus may be on software RAID implementations, and in particular implementations of RAID levels 0 and 1.

Not shown in FIG. 1 is a circuit board. This circuit board, which may be a motherboard, backplane, or midplane, may include slots into which processor 110, memory 115, and/or storage devices 120 may be installed. Note that depending on the implementation, one or more of these components may be installed directly onto the circuit board, rather than being installed in slots. In addition, embodiments of the disclosure may include multiple circuit boards that interconnect, with the components installed across these circuit boards.

Figure 2:
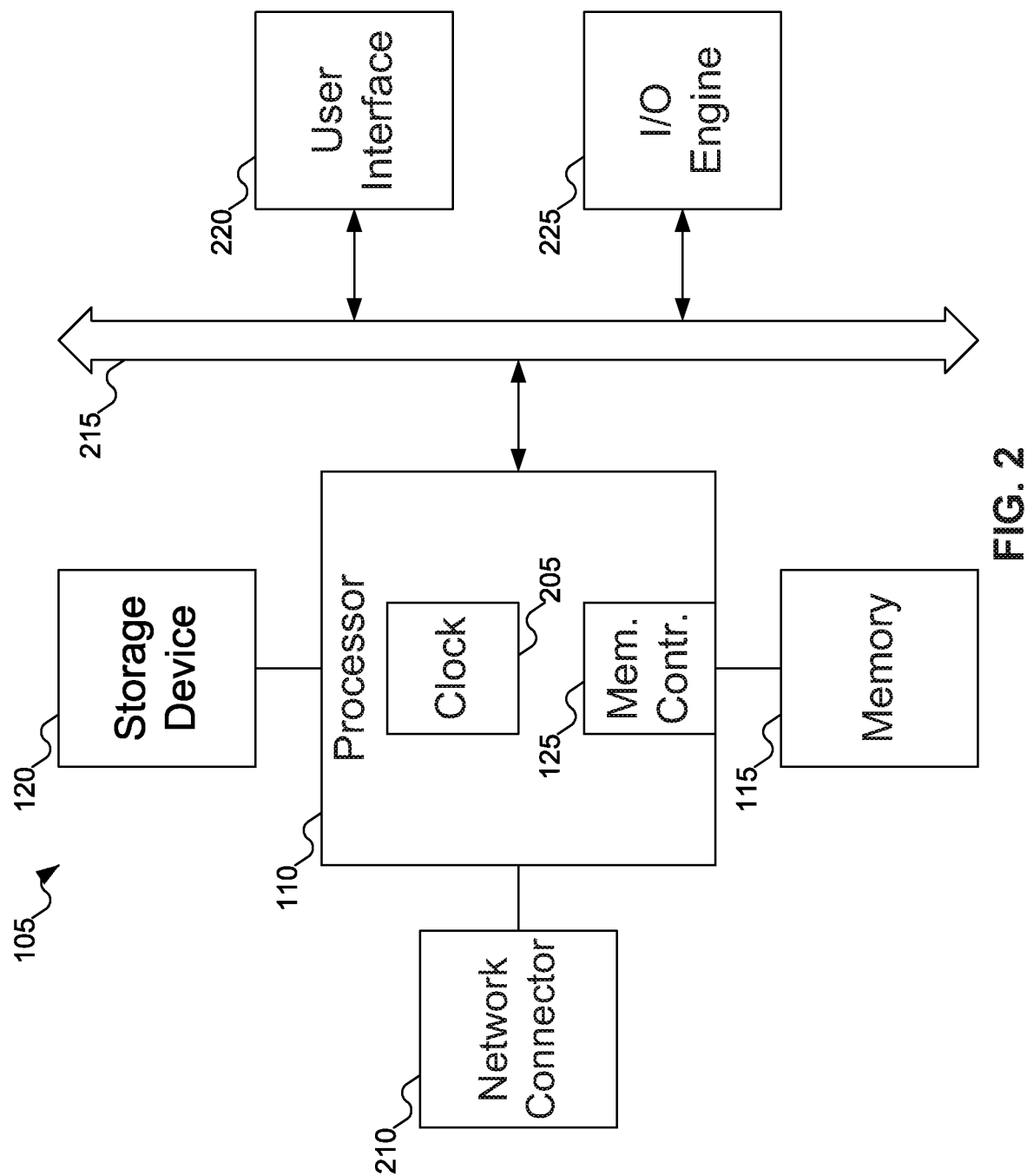
FIG. 2 shows some additional details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
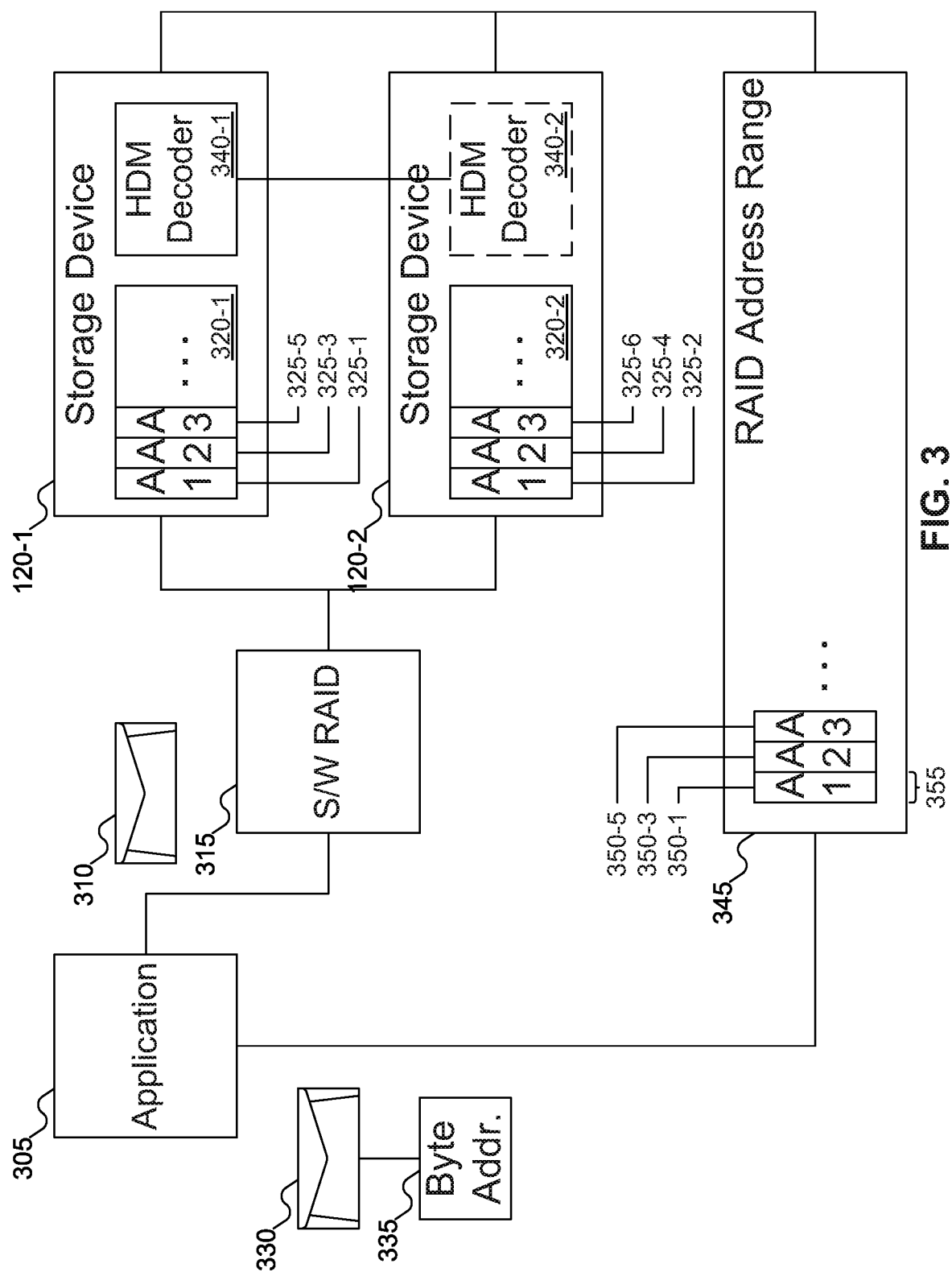
FIG. 3 shows the implementation of a RAID level 1 configuration using the storage devices of FIG. 1, according to embodiments of the disclosure.

FIG. 3 shows the implementation of a RAID level 1 configuration using storage devices 120 of FIG. 1, according to embodiments of the disclosure. In FIG. 3, application 305 may be running on processor 110 of FIG. 1. Application 305 may issue various requests to access data from storage devices 120. For example, application 305 might issue block level protocol request 310 (such as a read or write request) to access one or more blocks of data from storage devices 120. This request may be issued, for example, by requesting access to a file through a file system implemented on system 105 of FIG. 1. Software RAID 315 (which may run as a device driver or as part of the operation system on system 105 of FIG. 1) may receive the request and interpret the request appropriately to access the requested data from storage devices 120.

But as discussed above, storage devices 120 may implement a cache coherent interface protocol, which may support both the block level protocol and a byte level protocol. To support use of the byte level protocol, storage devices 120 might normally expose address ranges, such as address ranges 320-1 and 320-2 (which may be referred to collectively as address ranges 320). For example, address range 320-1 may include addresses spanning blocks 325-1, 325-3, and 320-5, whereas address range 320-2 may include addresses spanning blocks 325-2, 325-4, and 325-6 (blocks 320-1 through 320-6 may be referred to collectively as blocks 320). Embodiments of the disclosure may have address ranges 320 including different addresses.

Address ranges 320 may be exposed to application 305 as though they were part of the available memory of system 105. That is, address ranges 320 might appear to application as extensions of the addresses exposed by memory 115 of FIG. 1. Therefore, application 305 might issue byte level protocol request 330 (such as a load or store request), to access data from address ranges 320. Byte level protocol request 330 may include byte address 335, identifying the specific address in address ranges 320 to be accessed. (Byte level protocol request 330 may specify byte address 335 in any desired manner. For example, byte address 335 might be the actual address of interest, or byte address 335 might include an identifier—for example, the base address—of the block containing the data of interest and an offset into that block where the data begins. In addition, byte level protocol request 330 might include other data, such as the number of bytes to be accessed, and/or data to be stored at that address for a store request.) Thus, data stored on storage devices 120 might be accessed using either block level protocol request 310 or byte level protocol request 330.

Storage device 120-1 may include host-managed device memory (HDM) decoder 340-1. Similarly, storage device 120-2 may include HDM decoder 340-2. (HDM decoders 340-1 and 340-2 may be referred to collectively as HDM decoders 340, or just decoders 340.) HDM decoders 340 may be responsible for receiving byte address 335 in byte level protocol request 330 and converting byte address 335 into information that identifies where the data to be accessed is actually stored on storage devices 120.

When storage devices 120 are not part of a RAID implementation, it might not make a difference whether data is accessed using block level protocol request 310 or byte level protocol request 330. But when storage devices 120 are part of a RAID implementation, accessing data directly from storage devices using byte level protocol request 330 might result in changing data in a way that breaks the RAID. For example, consider the situation where storage devices 120 are used in a RAID level 1 configuration: that is, data is mirrored between storage devices 120. If application 305 issues a block level protocol request to change, say, data on storage device 120-1 but the corresponding data is not changed on storage device 120-2, the data might no longer be correctly mirrored. If block level protocol request 310 then attempts to access the block containing that data, software RAID 315 might not be able to determine which data is correct.

To address this concern, storage devices 120 may operate to expose a single address range, labeled RAID address range 345 in FIG. 3. Since storage devices 120 may be part of a RAID level 1 configuration, one storage device may be considered the main storage device, with the other storage devices considered secondary storage devices (storing the mirrored data). For example, storage device 120-1 may be labeled the main storage device, and storage device 120-2 may be labeled the secondary storage device.

HDM decoder 340 of the main storage device (in FIG. 3, HDM decoder 340-1 of storage device 120-1) may be responsible for exposing RAID address range 345 to system 105 of FIG. 1. HDM decoder 340-1 may determine address ranges 320 of storage devices 120 and generating RAID address range 345 from address ranges 320. For ease of understanding, blocks 350-1, 350-2, and 350-3 (which may be referred to collectively as blocks 350) include labels such as A1, A2, and A3. These labels may correspond to the labels used for blocks 325. Thus, for example, data stored to addresses in block 350-1 in RAID address range 345 may actually be stored in blocks 325-1 and 325-2 on storage devices 120-1 and 120-2, respectively.

In a RAID level 1 implementation, the overall storage capacity of the RAID may be equal to the smallest storage capacity of storage devices 120, and/or the block size to be used may be equal to the smallest block size of storage devices 120. HDM decoder 340-1 may determine this information and use this information to generate RAID address range 345, which may include blocks 350-1, 350-2, and 350-3 (which may be referred to collectively as blocks 350). For example, in FIG. 3, blocks 350 have block size 355.

An example might be helpful. For example, assume storage device 120-1 includes a total of approximately 500 GB of storage (that is, a total capacity of $2^{39}$ bytes), and that storage device 120-1 uses a block size of 512 KB (that is, a block size of $2^{19}$ bytes). Storage device 120-1 therefore would include a total of $2^{20}$ blocks. On the other hand, assume that storage device 120-2 offers a total capacity of approximately 250 GB of storage (that is, $2^{38}$ bytes of storage), but uses a block size of 1 MB (that is, a block size of $2^{20}$ bytes), meaning that storage device 120-2 would include a total of $2^{18}$ blocks. Storage device 120-1 therefore would have the smaller block size ($2^{19}$ bytes), but storage device 120-2 would have fewer total blocks ($2^{18}$ blocks). HDM decoder 340-1 might determine this information and configure RAID address range 345 to span a total of $2^{37}$ byte addresses ($2^{18}$ blocks, each of size $2^{19}$ bytes).

Note that in this example, because storage devices 120-1 and 120-2 have different total capacities and different block sizes, in each case some storage is not used. Thus, in the example described, RAID address range 345 might only use ¼ of the available storage of storage device 120-1 (since RAID address range 345 might include only ¼ of the number of blocks 325 in storage device 120-1), and RAID address range 345 might only ½ of the available storage of storage device 120-2 (since each block 350 in RAID address range 345 might include only ½ of the storage of blocks 325 in storage device 120-2). But depending on the implementation, RAID address range 345 might be configured more optimally, and if storage devices 120 are identical (as might be expected), RAID address range 345 might be able to utilize the entire capacity of storage devices 120.

Because storage devices 120 may be used to implement a RAID level 1 array, storage device 120-2 may mirror data on storage device 120-1. That is, blocks 325-2, 325-4, and 325-6 may be mirrors of blocks 325-1, 325-3, and 325-5. Put another way, any data stored in block 325-1 should also be stored in block 325-2, any data stored in block 325-3 should also be stored in block 325-4, and any data stored in block 325-5 should also be stored in block 325-6. For this reason, HDM decoder 340-2 might not be utilized, as shown by the used of dashed lines to represent HDM decoder 340-2 (although it still might be included in storage device 120-2 in some embodiments of the disclosure).

Because storage devices 120 may be used to implement a RAID level 1 configuration, if byte level protocol request 330 is a store request (that is, byte level protocol request 330 seeks to store data at byte address 335), it may be understood that the data should be stored in a block on storage device 120-1 as well as the mirror of that block on storage device 120-2. For example, if byte address 335 may be found in block 350-1 of RAID address range 345, and block 350-1 corresponds to block 325-1 of address range 320-1 (with block 325-2 of address range 320-2 acting as its mirror), byte level protocol request 330 might be sent to both storage devices 120. On the other hand, if byte level protocol request 330 is a load request (that is, byte level protocol request 330 seeks to read data at byte address 335), then the data might be read from either of storage devices 120 (since the data should be the same on both the main storage device and the secondary storage device. Byte level protocol request 330 might therefore be sent to one of storage devices 120: which storage device 120 is the destination might depend on the implementation. For example, in some embodiments of the disclosure all load requests might be sent to one storage device (which might be either of storage devices 120); in other embodiments of the disclosure load requests might be sent to different storage devices 120 in any desired manner (for example, using a round robin approach) to distribute load requests across storage devices 120: distributing load requests might result in faster loading of data.

This management of which storage device 120 processes a particular request may depend on the implementation. In some embodiments of the disclosure, it may be possible for system 105 of FIG. 1 (for example, software RAID 315 or some other software element not shown in FIG. 3) to determine which storage device 120 to access, and byte level protocol request 330 might be directed accordingly. In other embodiments of the disclosure, system 105 of FIG. 1 might send all requests to storage device 120-1 (the main storage device): HDM decoder 340-1 might then be responsible for distributing or broadcasting requests to storage device 120-2 (the secondary storage device). For example, HDM decoder 340-1 might broadcast store requests to all storage devices 120 (to ensure that data is correctly mirrored), and/or might distribute load requests across storage devices 120 (to attempt to achieve faster loading of data).

One concern that may arise is if one of storage devices 120 should become unavailable. This situation may occur for any number of reasons: the storage device itself might experience some sort of internal problem with the circuitry, the storage device might become disconnected from the rest of system 105 of FIG. 1, the flash memory might be defective (but the defect not detectable), or a power surge that could not be intercepted destroyed part of the storage device are just a few possibilities.

Regardless of the reason why, system 105 of FIG. 1 may need to handle this situation. Fortunately, as storage devices 120 are in a mirror arrangement, the failure of any storage devices in the RAID may not cause the RAID to fail entirely: as long as there is at least one storage device 120 that is functioning, that storage device 120 may be used to service requests from processor 110 of FIG. 1. Once the problem causing the offline storage device 120 is corrected, storage devices 120 may then resynchronize the RAID to ensure that storage devices 120 are mirrors of each other.

If such a situation should occur, system 105 of FIG. 1 may detect that one of storage devices 120 is offline. System 105 of FIG. 1 may then direct requests to the other storage device 120. For example, if storage device 120-1 (the main storage device) should go offline, system 105 of FIG. 1 may direct requests to storage device 120-2 (the secondary storage device), and HDM decoder 340-2 may then process requests as though storage device 120-2 was the main storage device.

In some situations, a storage device might go offline and not function correctly to access data, but might still be partially functional. For example, there might be a problem with the flash memory of storage device 120-1, but HDM decoder 340-1 might still be functioning. In such situations, system 105 of FIG. 1 may still direct requests to HDM decoder 340-1, and HDM decoder 340-1, aware that the flash memory of storage device 120 is not functioning, may send the requests to storage device 120-2 for processing.

In some embodiments of the disclosure, if data is available from at least one storage device 120, requests may be processed as usual from whatever storage devices 120 are functioning (with an administrator being notified that a storage device 120 is offline). In other embodiments of the disclosure, while the data might still be available, system 105 of FIG. 1 may pause the execution of application 305 until the problem is addressed and the RAID is reconfigured, at which point application 305 may continue to execute. Reconfiguring the RAID may involve, for example, addressing the problem affecting the offline storage device (which might involve replacing that storage device) and/or making any appropriate adjustments to HDM decoders 340 (such as accounting for a different exposed address range 320 for a repaired or replaced storage device, configuring HDM decoder 340 of a repaired or replaced storage device to communicate with HDM decoder 340-1 of main storage device 120-1, or specifying another storage device 120 as the main storage device if storage device 120-1 was the one that experienced the problem).

While FIG. 3 shows how storage devices 120 might be used for byte level protocol access in RAID level 0, as discussed above other RAID levels are also possible. RAID level 1 may also enable byte level protocol access to data on storage devices 120.

Figure 4:
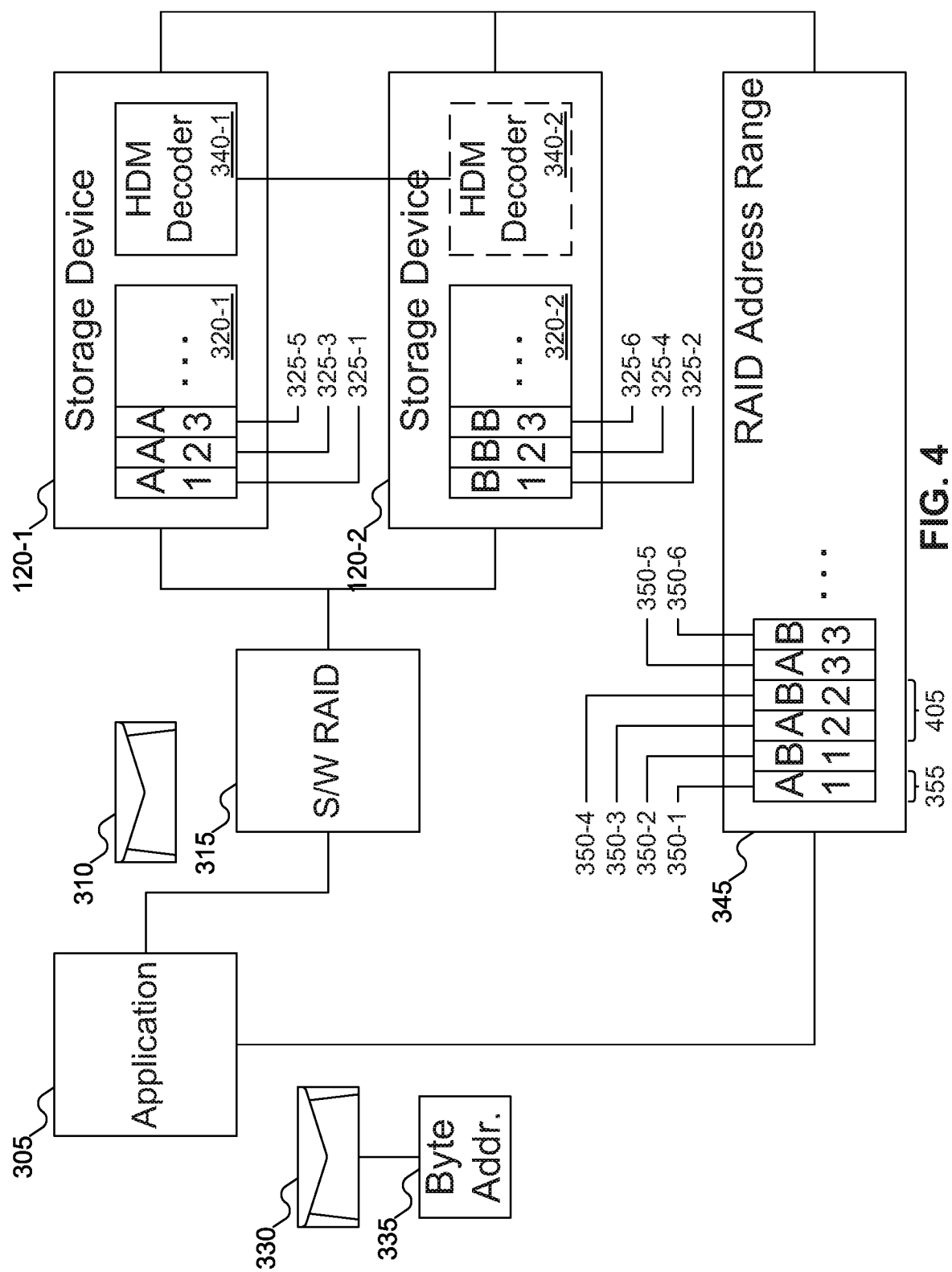
FIG. 4 shows the implementation of a RAID level 0 configuration using the storage devices of FIG. 1, according to embodiments of the disclosure.

FIG. 4 shows the implementation of a RAID level 0 configuration using storage devices 120 of FIG. 1, according to embodiments of the disclosure. In FIG. 4, most of the figure is similar to that of FIG. 3. The differences are that storage device 120-2, instead of mirroring the data stored on storage device 120-1, may now store different data. Thus, blocks 325-2, 325-4, and 325-6 may store different data from blocks 325-1, 325-3, and 325-5. This change may also be reflected in RAID address range 345, which may now include blocks 350-1 through 350-6. As with FIG. 3, blocks 350 and 325 in FIG. 4 are labeled to show how blocks (and addresses) in blocks 350 in RAID address range 345 may correspond to blocks (and addresses) in blocks 325 in address ranges 320.

As may be seen in FIG. 4, unlike FIG. 3, in a RAID level 0 configuration data may not be mirrored across storage devices 120. Instead, different blocks in RAID address range 345 may map to different blocks 325 in each of storage devices 120-1 and 120-2. For example, block 350-1 in RAID address range 345 may correspond to block 325-1 in storage device 120-1, but block 350-2 in RAID address range 345 may correspond to block 325-2 in storage device 120-2. In other words, each storage device 120 may store different data, with no copying of data between (or across) storage devices 120.

RAID level 0 may introduce the concept of the stripe. The stripe may represent the amount of data that may be stored at corresponding addresses across storage devices 120. The size of a stripe may therefore be understood to be the size of an individual block, multiplied by the number storage devices in the stripe. For example, in FIG. 4 there are two storage devices 120 in the RAID level 0 configuration: thus, a stripe, such as that including blocks 350-3 and 350-4, may have stripe size 405.

While RAID level 1 configurations might not necessarily include the concept of the "stripe", a stripe may be implied even in RAID level 1. For example, an individual block in RAID address range 345 may be considered a "stripe", even though normally a stripe is considered to include more than one block.

As with RAID level 1, the size of the RAID level 0 configuration may be affected by the size of a block on the individual storage devices 120, and the number of blocks in the individual storage devices 120. But unlike RAID level 1, the overall size of the RAID may be increased by adding additional storage devices. (Again, this increase in size may not add redundancy in a RAID level 0 configuration.)

Again, an example might be helpful. For example, assume again storage device 120-1 includes a total of approximately 500 GB of storage (that is, a total capacity of $2^{39}$ bytes), and that storage device 120-1 uses a block size of 512 KB (that is, a block size of $2^{19}$ bytes). Storage device 120-1 therefore would include a total of $2^{20}$ blocks. On the other hand, assume that storage device 120-2 offers a total capacity of approximately 250 GB of storage (that is, $2^{38}$ bytes of storage), but uses a block size of 1 MB (that is, a block size of $2^{20}$ bytes), meaning that storage device 120-2 would include a total of $2^{18}$ blocks. Storage device 120-1 therefore would have the smaller block size ($2^{19}$ bytes), but storage device 120-2 would have fewer total blocks ($2^{18}$ blocks). HDM decoder 340-1 might determine this information and configure RAID address range 345 to span a total of $2^{38}$ byte addresses ($2^{18}$ blocks, each of size $2^{19}$ bytes, on two storage devices).

Note that in this example, because storage devices 120-1 and 120-2 have different total capacities and different block sizes, in each case some storage is not used. Thus, in the example described, RAID address range 345 might only use ¼ of the available storage of storage device 120-1 (since RAID address range 345 might include only ¼ of the number of blocks 325 in storage device 120-1), and RAID address range 345 might only ½ of the available storage of storage device 120-2 (since each block 350 in RAID address range 345 might include only ½ of the storage of blocks 325 in storage device 120-2). But depending on the implementation, RAID address range 345 might be configured more optimally, and if storage devices 120 are identical (as might be expected), RAID address range 345 might be able to utilize the entire capacity of storage devices 120.

As the data stored on each storage device 120 may differ in a RAID level 0 configuration, HDM decoder 340-1 may be responsible for determining which storage device actually stores the block containing byte address 335, and may direct byte level protocol request 330 to the appropriate storage device. For example, HDM decoder 340-1 may determine which block contains byte address 335: using this information, HDM decoder 340-1 may then determine which storage device 120 actually stores byte address 335. For example, by taking byte address 335 modulo stripe size 410, HDM decoder 340-1 may treat byte address 335 as though it was in the first stripe in RAID address range 345. Then, by dividing that result by block size 355 and taking the integer component, a particular block within that first stripe may be identified: storage device 120 that stores this block in address range 320 may store byte address 335. For example, by dividing byte address 335 by stripe size 405, byte address 335 may be effectively treated as being in either of blocks 350-1 or 350-2 (assuming that the RAID includes only two storage devices 120: if the RAID includes more than two storage devices, the procedure may generalize to more storage devices). Then, by dividing by block size 355, one of blocks 350-1 or 350-2 may effectively by identified. Since storage device 120-1 may store block 350-1 and storage device 120-2 may store block 350-2, the storage device so identified by HDM decoder 340-1 may store byte address 335.

Since storage devices 120 in a RAID level 0 configuration may store different data, load and store requests may be directed to the individual storage device 120 that covers byte address 335 for byte level protocol request 330. That is, data is not mirrored, so store requests may be processed only by the affected storage device(s) 120 (depending on the size of the data being stored). Similarly, load requests may be processed only by the affected storage device(s) 120 (since the data may not be read from other storage devices 120).

As with RAID level 1 configurations, this management of which storage device 120 processes a particular request may depend on the implementation. In some embodiments of the disclosure, it may be possible for system 105 of FIG. 1 (for example, software RAID 315 or some other software element not shown in FIG. 3) to determine which storage device 120 to access, and byte level protocol request 330 might be directed accordingly. In other embodiments of the disclosure, system 105 of FIG. 1 might send all requests to storage device 120-1: HDM decoder 340-1 might then be responsible for forwarding requests to storage device 120-2 if byte address 335 in question is actually stored on storage device 120-2.

In RAID level 0 configurations, as with RAID level 1 configurations, one HDM decoder may be responsible for managing how RAID address range 345 is exposed, and for determining which storage device 120 actually stores the data identified by byte address 335. Either HDM decoder 340 may be selected to perform these functions.

While RAID level 1, as discussed above, may continue to function in a reduced capacity if one or more storage devices 120 is offline (as long as at least one storage device 120 is functional, there is a copy of the data available), RAID level 0 does not offer any such redundancy. Since the data is split between (or among) storage devices 120, if one or more storage devices 120 go offline for any reason, some data may not be accessible. Embodiments of the disclosure, upon detecting that a storage device 120 is offline for any reason, may pause execution of application 305 until the problem is corrected (and, hopefully, the data restored from some other location). Once the problem has been corrected and the RAID rebuilt/reconfigured, application 305 may continue executing.

In both RAID level 0 and level 1 configurations, byte address 335 might differ from the actual address where the data is stored on storage devices 120. For example, if storage devices 120 are Solid State Drives (SSDs) using NAND flash memory, pages and blocks in an SSD may be written with data, but they may not be overwritten. To change the values stored at a particular address (as used by application 305), the SSD may copy out the data from the original page or block, invalidate the original block, make the requested changes to the copy, and then write the changed data to a new page or block. To keep track of where the data is actually stored, the SSD may use a flash translation layer to map addresses as used by application 305 to addresses where the data is actually stored.

Even more, to recover pages or blocks that have been invalidated, the SSD may erase all the data a block or a superblock. If there is any valid data still in the block or superblock being erased, the SSD may copy that data out of the block or superblock to a new location before erasing the block or superblock. Again, the SSD may use the flash translation layer to manage translating addresses as used by application 415 to the location where the data is actually stored.

In addition, while each address range 320 might be contiguous, the portions of RAID address range 345 that might map to those addresses might not be contiguous. For example, in FIG. 4, blocks 350-1, 350-3, and 350-5 in RAID address range 345 may map to blocks 325-1, 325-3, and 325-5 in address range 320-1, whereas blocks 350-2, 350-4, and 350-6 in RAID address range 345 may map to blocks 325-2, 325-4, and 325-6 in address range 320-2. Thus, even before an address is received at storage devices 120, there may have been some address translation (and more address translation may occur within storage devices 120). Put another way, byte address 335 may be used by application 305. From byte address 335, another address may be generated, which may be provided to the storage device 120 where the data is actually stored. From this address, yet another address may be generated, which may represent where the data is actually stored on storage device 120.

The generation of the intermediary byte address may depend on the RAID level being implemented as well as how RAID address range 345 is generated. For example, FIG. 4 assumes that each stripe across storage devices 120 is represented by a contiguous address range in RAID address range 345. In that case, the actual byte address storage devices 120 expect to receive may be generated by dividing byte address 335 by stripe size 405. The integer part of this computation may then be multiplied by block size 355. Finally, the remainder of byte address 335 divided by block size 355 may be added to result (to act as an offset into the actual block where the data is stored). In addition, should RAID address range 345 use a different starting address from address ranges 320, the difference between the starting addresses of the address ranges may be factored in by subtracting the base address of RAID address range 345 and adding the base address of address ranges 320. On the other hand, in FIG. 3, RAID address range 345 of FIG. 3 appears to be identical to each address range 320 of FIG. 3 except possibly for the base address of these address ranges, in which case the generated byte address might only need to account for the base addresses of address ranges 320 and 345 of FIG. 3.

If RAID address range 345 is generated in other ways—for example, with each address range 320 treated as a contiguous portion of RAID address range 345—then the process for generating the byte address to be delivered to storage device 120 may differ. Embodiments of the disclosure may include any manner for generating RAID address range 345 from address ranges 320, and any manner of generating a new byte address from byte address 335 for delivery to storage device 120 that stores the data in question.

The generation of the byte address storage devices 120 may expect to receive may happen outside storage devices 120 (or at least, outside the storage device 120 that stores the requested data). But since each storage device 120 may handle internal address management independently from what happens outside the storage device, HDM decoder 340 may still be used as part of address even if HDM decoder 340 is not used to manage the address range exposed to system 105 of FIG. 1. For example, in FIGS. 3-4, HDM decoder 340-1 is responsible for exposing RAID address range 345 to system 105 of FIG. 1. But HDM decoder 340-2, even though it does not expose an address range to system 105 of FIG. 1, may still be involved in translating an address as received at storage device 120-2 into the actual location where the data in question is stored.

Figure 5A:
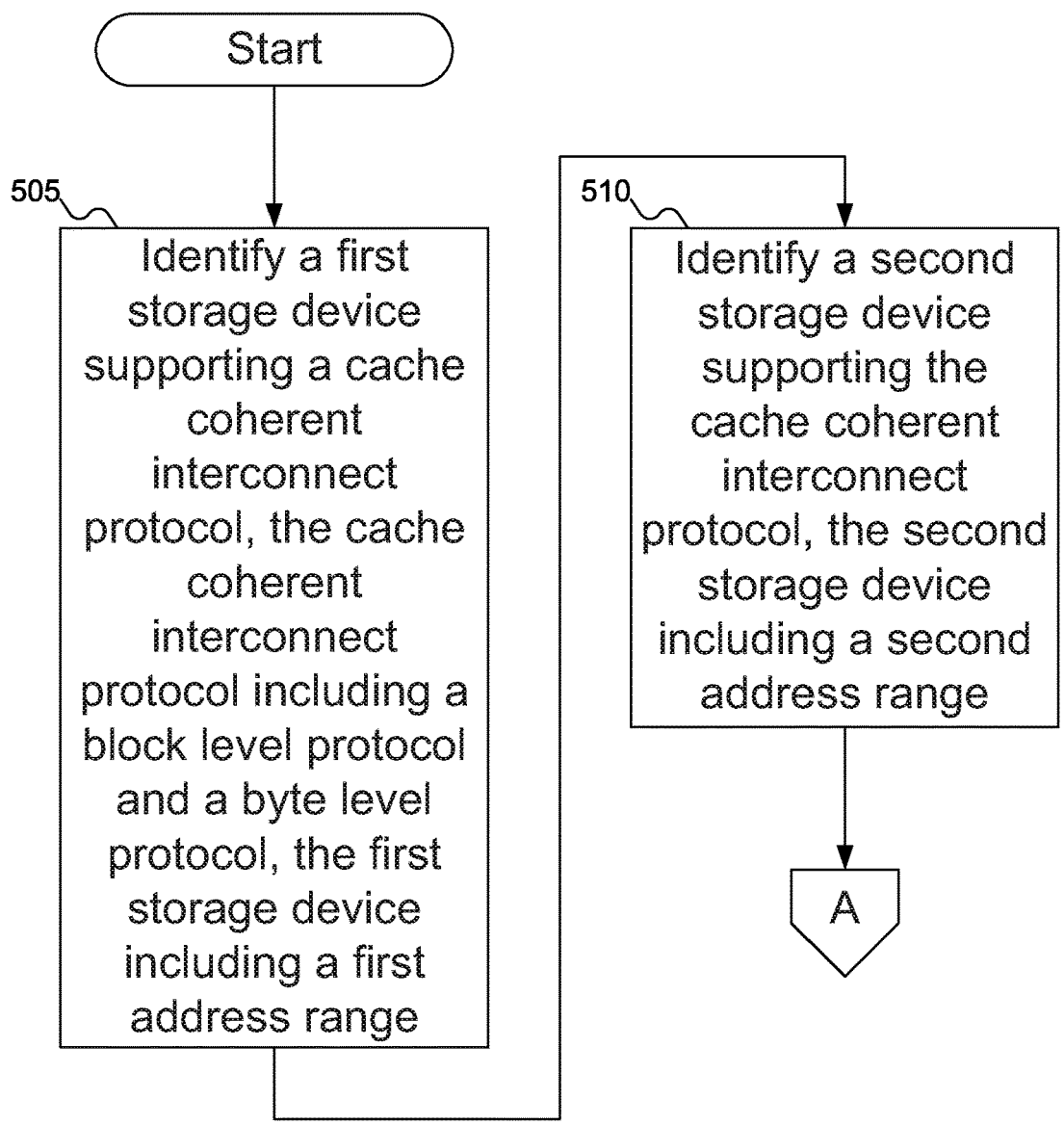
FIG. 5A shows a flowchart of an example procedure to initialize a RAID configuration as part of initialization of the RAID of FIG. 1, according to embodiments of the disclosure.
Figure 5B:
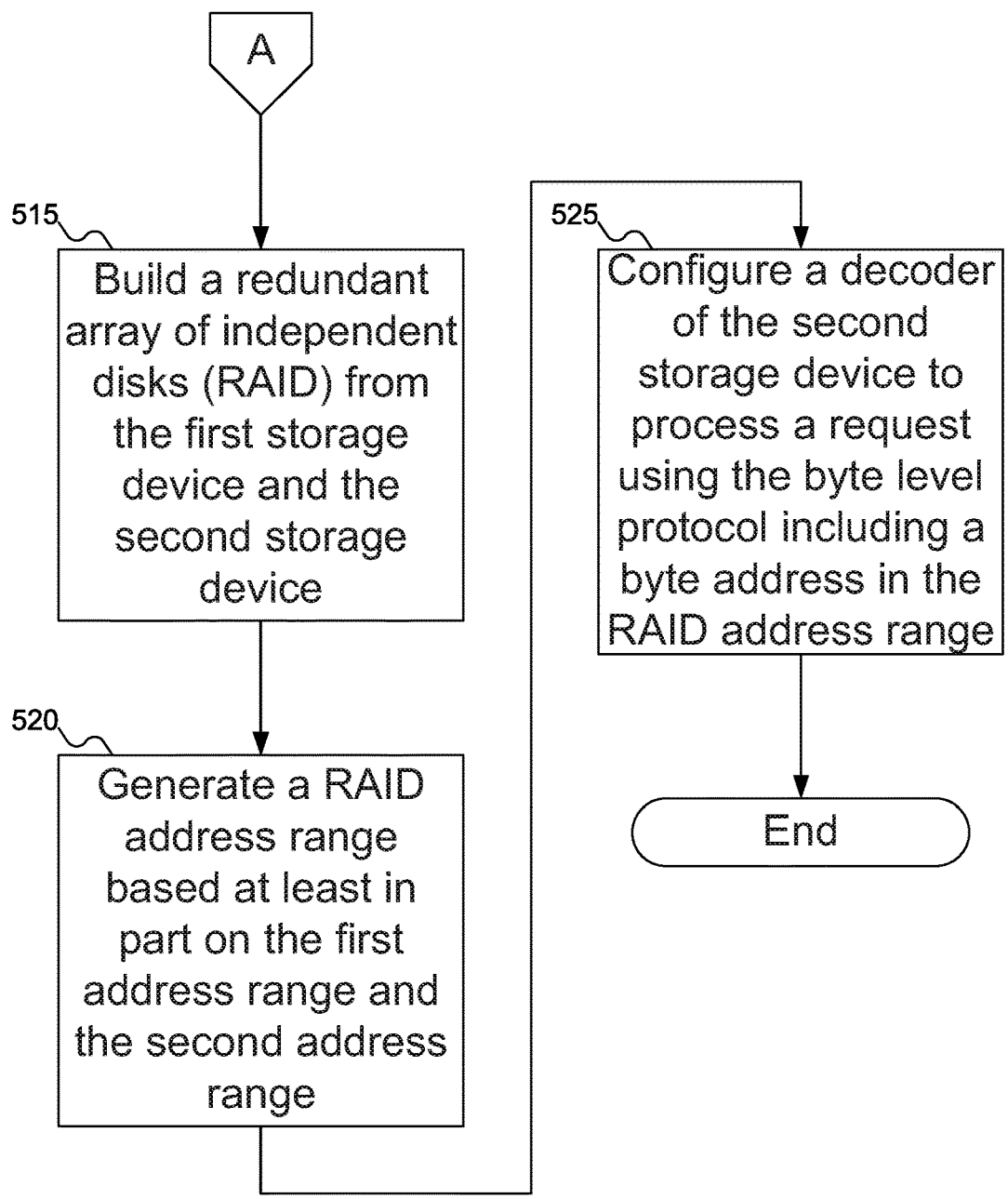
FIG. 5B continues the flowchart of an example procedure to initialize a RAID configuration as part of initialization of the RAID of FIG. 1, according to embodiments of the disclosure.

FIGS. 5A-5B show a flowchart of an example procedure to initialize a RAID configuration as part of initialization of the RAID of FIG. 1, according to embodiments of the disclosure. In FIG. 5A, at block 505, system 105 of FIG. 1 (or some element within system 105 of FIG. 1, such as the operating system or a software element) may identify storage device 120-1 of FIG. 1. Storage device 120-1 of FIG. 1, as discussed above, may support the use of a cache coherent interconnect protocol and may support both block level access and byte level access to data on storage device 120-1 of FIG. 1. Storage device 120-1 of FIG. 1 may also expose address range 320-1 of FIGS. 3-4 that may be used for byte level access to data.

At block 510, system 105 of FIG. 1 (or some element within system 105 of FIG. 1, such as the operating system or a software element) may identify storage device 120-2 of FIG. 1. Like storage device 120-1 of FIG. 1, storage device 120-2 of FIG. 1 may support the use of a cache coherent interconnect protocol and may support both block level access and byte level access to data on storage device 120-2 of FIG. 1. Storage device 120-2 of FIG. 1 may also expose address range 320-2 of FIGS. 3-4 that may be used for byte level access to data.

At block 515 (FIG. 5B), system 105 of FIG. 1 (or some element within system 105 of FIG. 1, such as the operating system or a software element) may build a RAID from storage devices 120 of FIG. 1. As part of building the RAID, system 105 of FIG. 1 may load a RAID configuration. The RAID configuration may be stored in any desired non-volatile storage. For example, the RAID configuration may be stored on one of storage devices 120 of FIG. 1. Or, the RAID configuration may be stored in a local storage area, such as a non-volatile storage of system 105 of FIG. 1. Examples of such non-volatile storage may include NAND flash storage, a read-only memory (ROM), a programmable ROM (PROM), an erasable programmable ROM (EPROM), or an electrically erasable programmable ROM (EEPROM); other forms of non-volatile storage may also be used to store the RAID configuration.

At block 520, system 105 of FIG. 1 (or some element within system 105 of FIG. 1, such as the operating system or a software element) may generate RAID address range 345 of FIGS. 3-4 from address ranges 320 of FIGS. 3-4. System 105 of FIG. 1 (or some element within system 105 of FIG. 1, such as the operating system or a software element) may use any desired approach to generate RAID address range 345 of FIGS. 3-4, and may factor in the RAID configuration being used. Finally, at block 525, system 105 of FIG. 1 (or some element within system 105 of FIG. 1, such as the operating system or a software element) may configure HDM decoder 340-1 of FIGS. 3-4 to process byte level protocol requests 330 of FIGS. 3-4, with other HDM decoders 340 of FIGS. 3-4 "hidden" from processing the requests.

Figure 6:
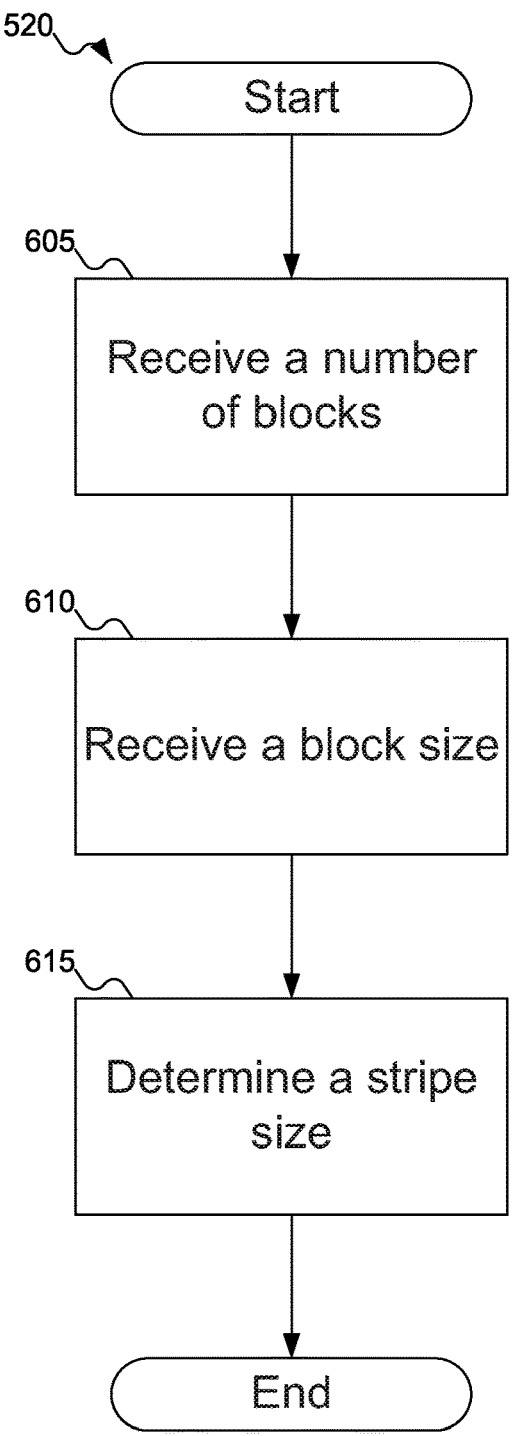
FIG. 6 shows a flowchart of an example procedure for the machine of FIG. 1 to generate the RAID address range of FIGS. 3-4 using the storage devices of FIG. 1, according to embodiments of the disclosure.

FIG. 6 shows a flowchart of an example procedure for machine 105 of FIG. 1 to generate RAID address range 345 of FIGS. 3-4 using storage devices 120 of FIG. 1, according to embodiments of the disclosure. In FIG. 6, at block 605, system 105 of FIG. 1 (or some element within system 105 of FIG. 1, such as the operating system or a software element) may receive a number of blocks to include in RAID address range 345 of FIGS. 3-4. At block 610, system 105 of FIG. 1 (or some element within system 105 of FIG. 1, such as the operating system or a software element) may receive block size 355 of FIG. 3 from HDM decoder 340 of FIGS. 3-4. At block 615, system 105 of FIG. 1 (or some element within system 105 of FIG. 1, such as the operating system or a software element) may determine stripe size 405 of FIG. 4 from HDM decoder 340 of FIGS. 3-4. Note that stripe size 405 of FIG. 4 might be determined as, for example, the product of block size 355 of FIG. 3 and the number of storage devices 120 of FIG. 1 in the RAID. System 105 of FIG. 1 (or some element within system 105 of FIG. 1, such as the operating system or a software element) may then use this information to generate RAID address range 345 of FIGS. 3-4.

FIG. 6 appears to imply that system 105 of FIG. 1 (or some element within system 105 of FIG. 1, such as the operating system or a software element) receives the number of blocks, block size 355 of FIG. 3, and stripe size 405 of FIG. 4 once. In some embodiments of the disclosure, HDM decoder 340 of FIGS. 3-4 may communicate with each other once HDM decoder 340-1 of FIGS. 3-4 has been selected to handle processing of byte level protocol requests 330 of FIGS. 3-4, and the selected HDM decoder 340 of FIGS. 3-4 may then provide this information for RAID initialization. But in other embodiments of the disclosure, each storage device 120 of FIG. 1 may provide this information, and system 105 of FIG. 1 (or some element within system 105 of FIG. 1, such as the operating system or a software element) may then select what block size 355 of FIG. 3, stripe size 405 of FIG. 4, and the number of blocks to include in RAID address range 345 of FIG. 3.

FIG. 6 also appears to imply that the processes described are performed by the component of system 105 of FIG. 1 that is performing RAID initialization. In some embodiments of the disclosure, this may be true. But in other embodiments of the disclosure, this process may be handled by HDM decoder 340-1 of FIGS. 3-4. For example, HDM decoder 340-1 of FIGS. 3-4 might receive this information from HDM decoder 340-2 of FIGS. 3-4, and might use that information in generating RAID address range 345 of FIGS. 3-4. In still other embodiments, the component of system 105 of FIG. 1 that is performing RAID initialization might receive this information and store it for later use, then provide this information to HDM decoder 340-1 of FIGS. 3-4 in support of the generation of RAID address range 345 of FIGS. 3-4.

Figure 7:
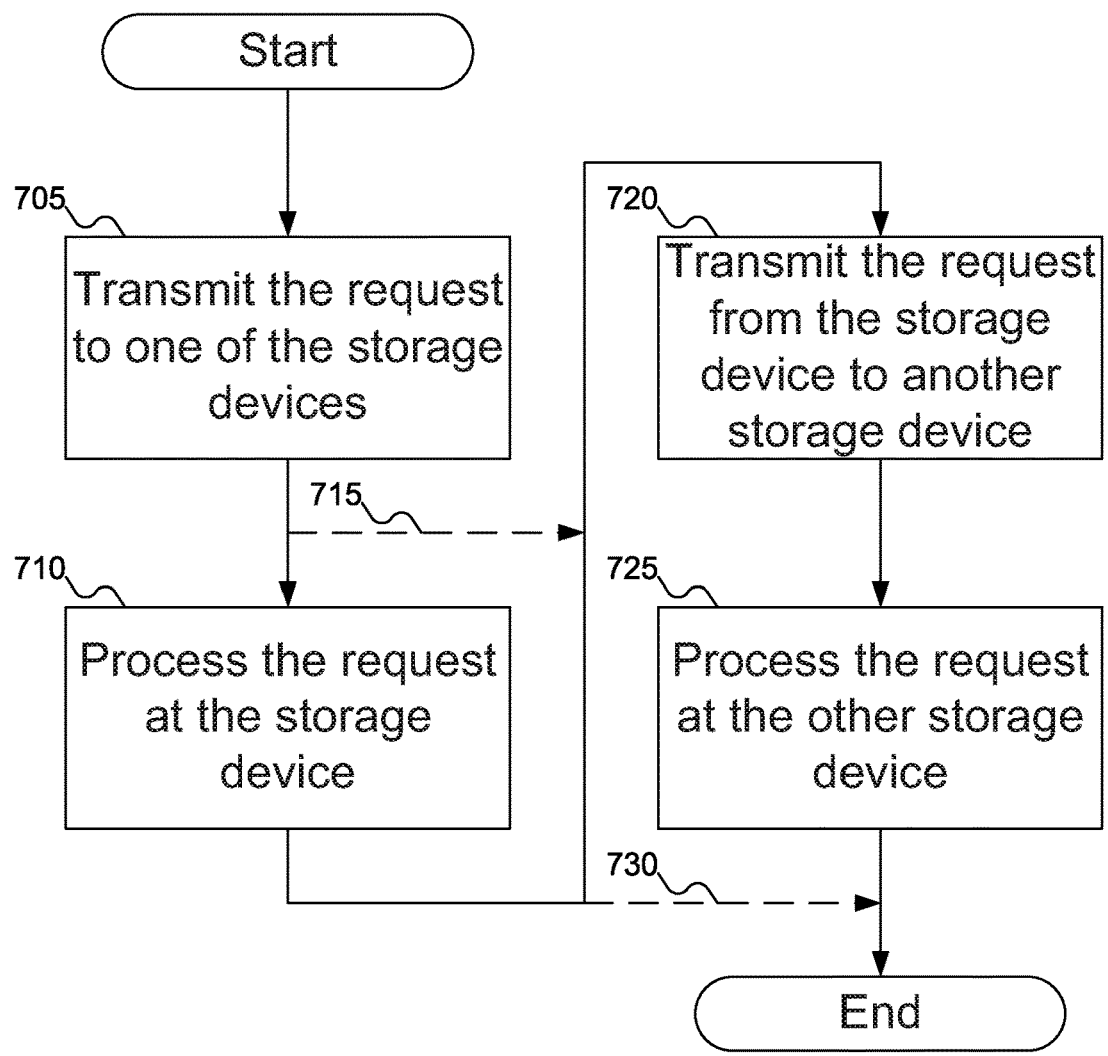
FIG. 7 shows a flowchart of an example procedure to use the Host Managed Device Memory (HDM) decoder of FIGS. 3-4, according to embodiments of the disclosure.

FIG. 7 shows a flowchart of an example procedure to use HDM decoder 340-1 of FIGS. 3-4, according to embodiments of the disclosure. In FIG. 7, at block 705, byte level protocol request 330 of FIGS. 3-4 may be transmitted to HDM decoder 340-1 of FIGS. 3-4 at storage device 120-1 of FIG. 1. HDM decoder 340-1 of FIGS. 3-4 may determine that byte level protocol request 330 of FIGS. 3-4 is to be processed at storage device 120-1 of FIG. 1: at block 710, storage device 120-1 of FIG. 1 may then process byte level protocol request 330 of FIGS. 3-4. Note that block 710 may be omitted, as shown by dashed line 715.

HDM decoder 340-1 of FIGS. 3-4 might determine that storage device 120-2 of FIG. 1 is to process the request. In that case, at block 720, HDM decoder 340-1 of FIGS. 3-4 may transmit byte level protocol request 330 of FIGS. 3-4 to storage device 120-2 of FIG. 1, and at block 725 storage device 120-1 of FIG. 1 may then process byte level protocol request 330 of FIGS. 3-4. Note that blocks 720 and 725 may be omitted, as shown by dashed line 730.

Figure 8:
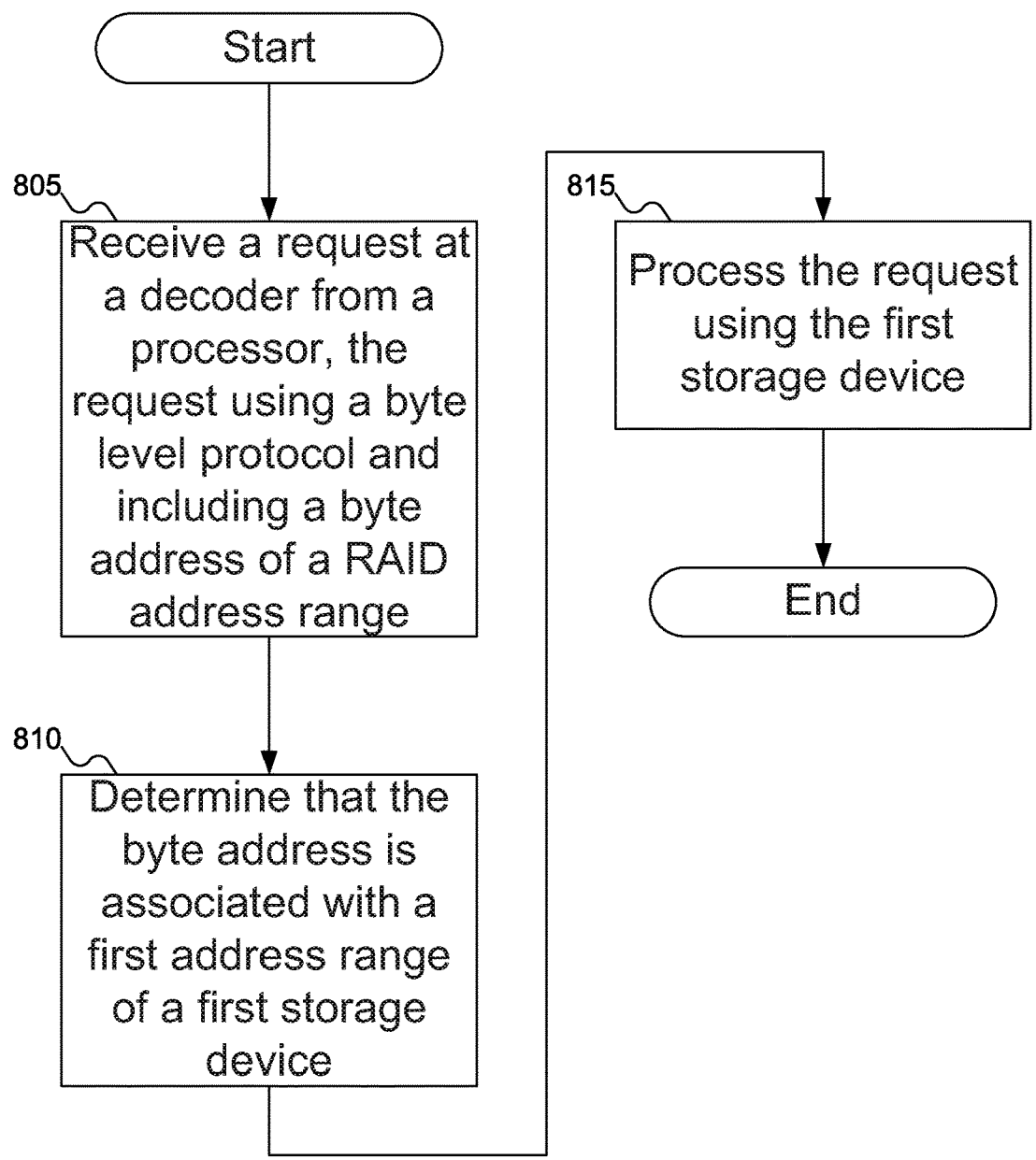
FIG. 8 shows a flowchart of an example procedure for processing the byte level protocol request of FIGS. 3-4 using the RAID of FIG. 1, according to embodiments of the disclosure.

FIG. 8 shows a flowchart of an example procedure for processing byte level protocol request 330 of FIGS. 3-4 using the RAID of FIG. 1, according to embodiments of the disclosure. In FIG. 8, at block 805, HDM decoder 340-1 of FIGS. 3-4 may receive byte level protocol request 330 of FIGS. 3-4. At block 810, HDM decoder 340-1 of FIGS. 3-4 may which storage device 120 of FIG. 1 is to process byte level protocol request 330 of FIGS. 3-4 based on byte address 335 of FIGS. 3-4. Finally, at block 815, the selected storage device 120 of FIG. 1 may process byte level protocol request 330 of FIGS. 3-4.

Figure 9:
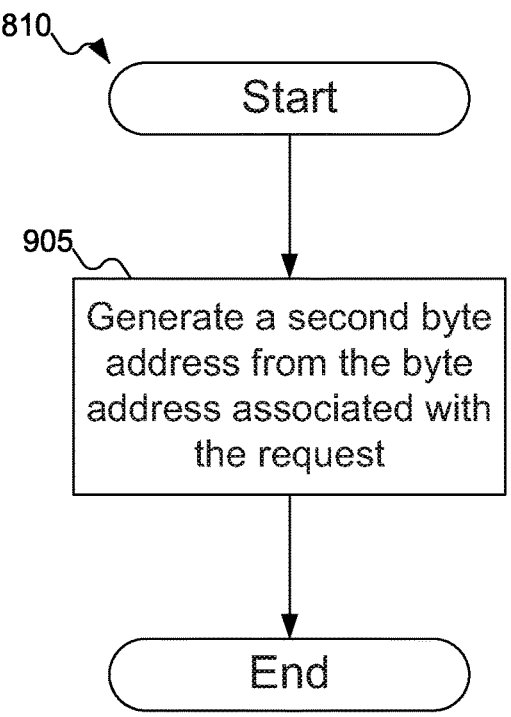
FIG. 9 shows a flowchart of an example procedure for generating a second byte address from the byte address of FIGS. 3-4 associated with the request of FIGS. 3-4 using the RAID of FIG. 1, according to embodiments of the disclosure.

FIG. 9 shows a flowchart of an example procedure for generating a second byte address from byte address 335 of FIGS. 3-4 associated with the request of FIGS. 3-4 using the RAID of FIG. 1, according to embodiments of the disclosure. At block 905, HDM decoder 340-1 of FIGS. 3-4 may generate a second byte address from byte address 335 of FIGS. 3-4. As discussed above, this process may depend on the RAID implementation, how RAID address range 345 of FIGS. 3-4 was generated, block size 355 of FIG. 3, and/or stripe size 405 of FIG. 4.

Figure 10:
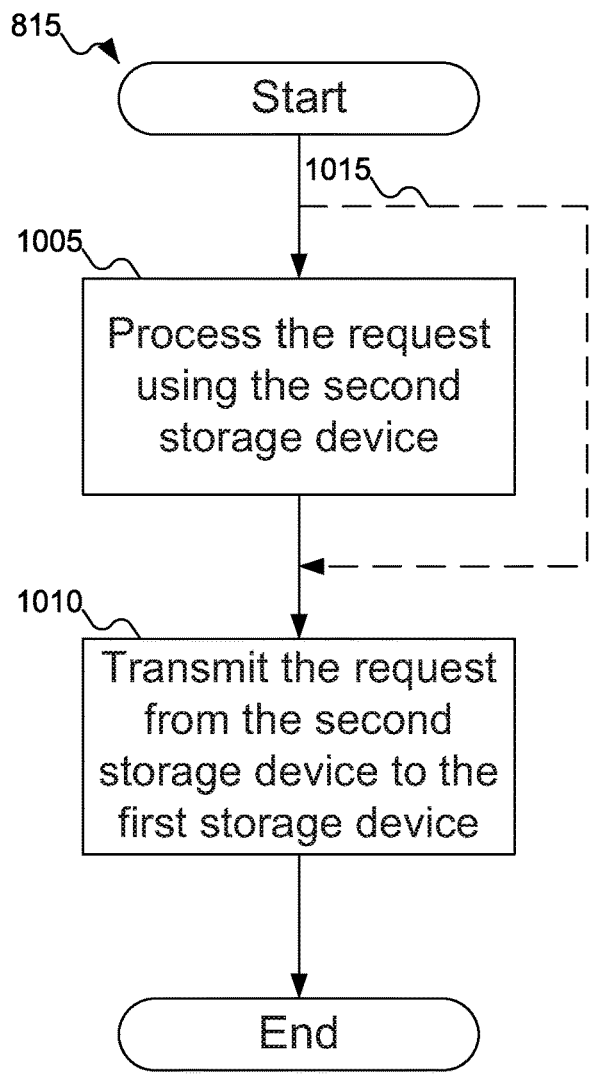
FIG. 10 shows a flowchart of an example procedure for the storage devices of FIG. 1 to process the byte level protocol request of FIGS. 3-4, according to embodiments of the disclosure.

FIG. 10 shows a flowchart of an example procedure for storage devices 120 of FIG. 1 to process byte level protocol request 330 of FIGS. 3-4, according to embodiments of the disclosure. In FIG. 10, at block 1005, storage device 120-1 of FIG. 1 may process byte level protocol request 330 of FIGS. 3-4. At block 1010, HDM decoder 340-1 of FIGS. 3-4 may transmit byte level protocol request 330 of FIGS. 3-4 to storage device 120-2 of FIG. 1 for processing.

Note that if both of blocks 1005 and 1010 are performed, both storage devices 120 of FIG. 1 may be involved in processing byte level protocol request 330 of FIGS. 3-4. This may occur if, for example, if the RAID implements a RAID level 1 configuration: store requests may be processed by both storage devices 120 of FIG. 1 to maintain the mirror, and load requests might be distributed to both storage devices 120 of FIG. 1 to improve load performance. Also, if the RAID implements a RAID level 0 configuration and byte level protocol request 330 of FIGS. 3-4 involves two (or more) adjacent blocks 350 of FIGS. 3-4, then part of byte level protocol request 330 of FIGS. 3-4 may be processed by each storage device 120 of FIG. 1. If only storage device 120-2 of FIG. 1 is to process byte level protocol request 330 of FIGS. 3-4, then block 1005 may be omitted, as shown by dashed line 1015.

In FIGS. 5-10, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a redundant array of independent disks (RAID) that may support processing byte level protocol requests for data stored on cache coherent interconnect protocol storage devices, without necessarily involving a hardware RAID implementation. One host-managed device memory (HDM) decoder may expose a RAID address range that may cover both (or all) storage devices, and may distribute or broadcast byte level protocol requests to the various storage devices. Embodiments of the disclosure provide a technical advantage in that applications may be agnostic to the implementation of the RAID and without using a hardware RAID solution, but still supporting byte level protocol access to data on the storage devices.

Compute Express Link (CXL) Solid State Drives (SSDs) may be exposed as a block device. The user may then use the CXL SSD as part of a Redundant Array of Independent Disks (RAID) using the C×L block device interface.

But if the CXL SSD is part of a RAID array, then there are potential problems. First, writing to an individual SSD in the RAID array might break the array. Second, if data is read from an individual SSD rather than as part of the RAID array, the data might not be checked using the parity offered by the RAID level used.

In addition, the CXL.mem path does not support RAID by its own. Using software to map each individual CXL device in the RAID array and do checking in software is slow and involves a significant amount of software adaption.

To address these concerns, embodiments of the disclosure may include a Host-Managed Device Memory (HDM) decoder and CXL peer-to-peer (p2p) to implement RAID 0 and RAID 1 functionality.

Advantages of the embodiments of the disclosure include a way to support RAID 0 and 1 in both the CXL.mem path and the CXL.io path without adding additional hardware engines. Errors may be detected and recovered over the CXL.mem path using RAID features. No application changes are needed, and no additional hardware RAID engine is required. Embodiments of the disclosure may offer improved reliability.

Embodiments of the disclosure support RAID 0 and RAID 1 configuration for the CXL.mem path using a software approach. Embodiments of the disclosure may reduce application complexity, may reduce the cost of deploying RAID 0 and RAID 1 configurations when using CXL devices. Reliability may be improved for applications that use CXL.mem. Finally, in some RAID configurations, performance may be improved by distributing traffic across devices (interlevelings).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
 a processor;
 a first storage device supporting a cache coherent interconnect protocol, the cache coherent interconnect protocol including a block level protocol and a byte level protocol, the first storage device including a first address range;
 a second storage device supporting the cache coherent interconnect protocol, the second storage device including a second address range, the second storage device providing a redundant array of independent disks (RAID) address range associated with the first address range and the second address range; and
 a decoder associated with the second storage device, the decoder configured to receive a request from the processor, the request using the byte level protocol and including a byte address in the RAID address range, and to determine that the byte address in the RAID address range is associated with a target address range,
 wherein the first storage device and the second storage device are included in a RAID.

Statement 2. An embodiment of the disclosure includes the system according to statement 1, wherein the cache coherent interconnect protocol includes a Compute Express Link (CXL) protocol.

Statement 3. An embodiment of the disclosure includes the system according to statement 1, wherein the processor is configured to build the RAID from the first storage device and the second storage device.

Statement 4. An embodiment of the disclosure includes the system according to statement 3, wherein the processor is further configured to identify the first storage device and the second storage device.

Statement 5. An embodiment of the disclosure includes the system according to statement 3, wherein the processor is further configured to determine a stripe size for the RAID.

Statement 6. An embodiment of the disclosure includes the system according to statement 5, wherein the processor is further configured to determine the stripe size for the RAID based at least in part on a block size.

Statement 7. An embodiment of the disclosure includes the system according to statement 6, wherein the stripe size is a product of the block size and a number of storage devices in the RAID.

Statement 8. An embodiment of the disclosure includes the system according to statement 6, wherein the decoder is configured to transmit the block size to the processor.

Statement 9. An embodiment of the disclosure includes the system according to statement 1, wherein:
 the first storage device includes a first block size;
 the second storage device includes a second block size; and
 the decoder is configured to select one of the first block size or the second block size as a RAID block size for the RAID.

Statement 10. An embodiment of the disclosure includes the system according to statement 9, wherein the RAID block size is a smaller of the first block size or the second block size.

Statement 11. An embodiment of the disclosure includes the system according to statement 1, wherein the decoder is further configured to determine that the byte address in the RAID address range is associated with the target address range based at least in part on a block size and a stripe size.

Statement 12. An embodiment of the disclosure includes the system according to statement 1, wherein the decoder is further configured to generate a second byte address in the target address range based at least in part on the byte address, a block size, and a stripe size.

Statement 13. An embodiment of the disclosure includes the system according to statement 12, wherein the decoder is further configured to generate a second byte address in the target address range based at least in part on the byte address, the block size, the stripe size, and a base address for the target address range.

Statement 14. An embodiment of the disclosure includes the system according to statement 1, wherein the RAID includes a RAID level 0 configuration.

Statement 15. An embodiment of the disclosure includes the system according to statement 14, wherein the target address range includes the second address range.

Statement 16. An embodiment of the disclosure includes the system according to statement 15, wherein the second storage device is configured to execute the request.

Statement 17. An embodiment of the disclosure includes the system according to statement 14, wherein the target address range includes the first address range.

Statement 18. An embodiment of the disclosure includes the system according to statement 17, wherein:
 the decoder is further configured to transmit the request to the first storage device; and
 the first storage device is configured to execute the request.

Statement 19. An embodiment of the disclosure includes the system according to statement 1, wherein the RAID includes a RAID level 1 configuration.

Statement 20. An embodiment of the disclosure includes the system according to statement 19, wherein the target address range includes the second address range.

Statement 21. An embodiment of the disclosure includes the system according to statement 20, wherein:
 the request includes a store request; and
 the second storage device is configured to execute the store request.

Statement 22. An embodiment of the disclosure includes the system according to statement 21, wherein:
 the decoder is further configured to transmit the store request to the first storage device; and
 the first storage device is configured to execute the store request.

Statement 23. An embodiment of the disclosure includes the system according to statement 20, wherein:
 the request includes a load request; and
 the second storage device is configured to execute the store request.

Statement 24. An embodiment of the disclosure includes the system according to statement 20, wherein:
 the request includes a load request; and the decoder is further configured to transmit the load request to the first storage device; and the first storage device is configured to execute the load request.

Statement 25. An embodiment of the disclosure includes a method, comprising:

identifying a first storage device supporting a cache coherent interconnect protocol, the cache coherent interconnect protocol including a block level protocol and a byte level protocol, the first storage device including a first address range;

identifying a second storage device supporting the cache coherent interconnect protocol, the second storage device including a second address range;

building a redundant array of independent disks (RAID) from the first storage device and the second storage device;

generating a RAID address range based at least in part on the first address range and the second address range; and configuring a decoder of the second storage device to process a request using the byte level protocol including a byte address in the RAID address range.

Statement 26. An embodiment of the disclosure includes the method according to statement 25, wherein the cache coherent interconnect protocol includes a Compute Express Link (CXL) protocol.

Statement 27. An embodiment of the disclosure includes the method according to statement 25, wherein generating the RAID address range based at least in part on the first address range and the second address range includes generating the RAID address range based at least in part on the first address range, the second address range, and a stripe size.

Statement 28. An embodiment of the disclosure includes the method according to statement 27, wherein generating the RAID address range based at least in part on the first address range and the second address range further includes determining the stripe size based at least in part on a block size.

Statement 29. An embodiment of the disclosure includes the method according to statement 28, wherein determining the stripe size based at least in part on the block size includes receiving the block size from the decoder.

Statement 30. An embodiment of the disclosure includes the method according to statement 25, wherein generating the RAID address range based at least in part on the first address range and the second address range includes generating the RAID address range to include a first RAID address associated with a first address in the first address range and a second RAID address associated with a second address in the second address range.

Statement 31. An embodiment of the disclosure includes the method according to statement 25, wherein configuring the decoder of the second storage device to process the request including the byte address in the RAID address range includes configuring the decoder of the second storage device to process the request based at least in part on the byte address, the RAID address range, a stripe size, and a block size.

Statement 32. An embodiment of the disclosure includes the method according to statement 30, further comprising transmitting the request to one of the first storage device or the second storage device based at least in part on the byte address, the RAID address range, a stripe size, and a block size.

Statement 33. An embodiment of the disclosure includes the method according to statement 32, wherein transmitting the request to one of the first storage device or the second storage device based at least in part on the byte address, the RAID address range, the stripe size, and the block size includes transmitting the request to the first storage device from the decoder based at least in part on the byte address, the RAID address range, the stripe size, and the block size.

Statement 34. An embodiment of the disclosure includes the method according to statement 25, wherein generating the RAID address range based at least in part on the first address range and the second address range includes generating the RAID address range to include a RAID address associated with an address in the second address range.

Statement 35. An embodiment of the disclosure includes the method according to statement 34, further comprising transmitting the request to one of the first storage device or the second storage device.

Statement 36. An embodiment of the disclosure includes the method according to statement 35, wherein:

transmitting the request to one of the first storage device or the second storage device includes transmitting the request to the second storage device; and the method further comprises transmitting the request to the first storage device from the decoder based at least in part on the byte address, the RAID address range, the stripe size, and the block size.

Statement 37. An embodiment of the disclosure includes a method, comprising:

receiving a request at a decoder from a processor, the request using a byte level protocol and including a byte address of a RAID address range;

determining that the byte address is associated with a first address range of a first storage device; and processing the request using the first storage device, wherein the RAID address range is associated with the first address range of the first storage device and a second address range of a second storage device, the first storage device supports a cache coherent interconnect protocol, the cache coherent interconnect protocol including a block level protocol and the byte level protocol, and the second storage device supports the cache coherent interconnect protocol.

Statement 38. An embodiment of the disclosure includes the method according to statement 37, wherein determining that the byte address is associated with the first address range of the first storage device includes generating a second byte address in the address range of the first storage device based at least in part on the byte address, a block size, and a stripe size.

Statement 39. An embodiment of the disclosure includes the method according to statement 38, wherein generating the second byte address in the address range of the first storage device based at least in part on the byte address, the block size, and the stripe size includes generating the second byte address in the address range of the first storage device based at least in part on the byte address, the block size, and the stripe size, and a base address for the first address range.

Statement 40. An embodiment of the disclosure includes the method according to statement 37, wherein the first storage device and the second storage device are part of a RAID, the RAID implementing a RAID level 0 configuration or a RAID level 1 configuration.

Statement 41. An embodiment of the disclosure includes the method according to statement 37, wherein the first storage device includes the decoder.

Statement 42. An embodiment of the disclosure includes the method according to statement 37, wherein:
the second storage device includes the decoder; and
processing the request using the first storage device includes transmitting the request from the decoder to the first storage device.

Statement 43. An embodiment of the disclosure includes the method according to statement 42, further comprising processing the request using the second storage device.

Statement 44. An embodiment of the disclosure includes an article, comprising a non-transitory storage medium, the non-transitory storage medium having stored thereon instructions that, when executed by a machine, result in:
identifying a first storage device supporting a cache coherent interconnect protocol, the cache coherent interconnect protocol including a block level protocol and a byte level protocol, the first storage device including a first address range;
identifying a second storage device supporting the cache coherent interconnect protocol, the second storage device including a second address range;
building a redundant array of independent disks (RAID) from the first storage device and the second storage device;
generating a RAID address range based at least in part on the first address range and the second address range; and
configuring a decoder of the second storage device to process a request using the byte level protocol including a byte address in the RAID address range.

Statement 45. An embodiment of the disclosure includes the article according to statement 44, wherein the cache coherent interconnect protocol includes a Compute Express Link (CXL) protocol.

Statement 46. An embodiment of the disclosure includes the article according to statement 44, wherein generating the RAID address range based at least in part on the first address range and the second address range includes generating the RAID address range based at least in part on the first address range, the second address range, and a stripe size.

Statement 47. An embodiment of the disclosure includes the article according to statement 46, wherein generating the RAID address range based at least in part on the first address range and the second address range further includes determining the stripe size based at least in part on a block size.

Statement 48. An embodiment of the disclosure includes the article according to statement 47, wherein determining the stripe size based at least in part on the block size includes receiving the block size from the decoder.

Statement 49. An embodiment of the disclosure includes the article according to statement 44, wherein generating the RAID address range based at least in part on the first address range and the second address range includes generating the RAID address range to include a first RAID address associated with a first address in the first address range and a second RAID address associated with a second address in the second address range.

Statement 50. An embodiment of the disclosure includes the article according to statement 44, wherein configuring the decoder of the second storage device to process the request including the byte address in the RAID address range includes configuring the decoder of the second storage device to process the request based at least in part on the byte address, the RAID address range, a stripe size, and a block size.

Statement 51. An embodiment of the disclosure includes the article according to statement 49, wherein the non-transitory storage medium has stored thereon further instructions that, when executed by the machine, result in transmitting the request to one of the first storage device or the second storage device based at least in part on the byte address, the RAID address range, a stripe size, and a block size.

Statement 52. An embodiment of the disclosure includes the article according to statement 51, wherein transmitting the request to one of the first storage device or the second storage device based at least in part on the byte address, the RAID address range, the stripe size, and the block size includes transmitting the request to the first storage device from the decoder based at least in part on the byte address, the RAID address range, the stripe size, and the block size.

Statement 53. An embodiment of the disclosure includes the article according to statement 44, wherein generating the RAID address range based at least in part on the first address range and the second address range includes generating the RAID address range to include a RAID address associated with an address in the second address range.

Statement 54. An embodiment of the disclosure includes the article according to statement 53, wherein the non-transitory storage medium has stored thereon further instructions that, when executed by the machine, result in transmitting the request to one of the first storage device or the second storage device.

Statement 55. An embodiment of the disclosure includes the article according to statement 54, wherein:
transmitting the request to one of the first storage device or the second storage device includes transmitting the request to the second storage device; and
the non-transitory storage medium has stored thereon further instructions that, when executed by the machine, result in transmitting the request to the first storage device from the decoder based at least in part on the byte address, the RAID address range, the stripe size, and the block size.

Statement 56. An embodiment of the disclosure includes an article, comprising a non-transitory storage medium, the non-transitory storage medium having stored thereon instructions that, when executed by a machine, result in:
receiving a request at a decoder from a processor, the request using a byte level protocol and including a byte address of a RAID address range;
determining that the byte address is associated with a first address range of a first storage device; and
processing the request using the first storage device,
wherein the RAID address range is associated with the first address range of the first storage device and a second address range of a second storage device,
the first storage device supports a cache coherent interconnect protocol, the cache coherent interconnect protocol including a block level protocol and the byte level protocol, and
the second storage device supports the cache coherent interconnect protocol.

Statement 57. An embodiment of the disclosure includes the article according to statement 56, wherein determining that the byte address is associated with the first address range of the first storage device includes generating a second byte address in the address range of the first storage device based at least in part on the byte address, a block size, and a stripe size.

Statement 58. An embodiment of the disclosure includes the article according to statement 57, wherein generating the second byte address in the address range of the first storage device based at least in part on the byte address, the block size, and the stripe size includes generating the second byte address in the address range of the first storage device based at least in part on the byte address, the block size, and the stripe size, and a base address for the first address range.

Statement 59. An embodiment of the disclosure includes the article according to statement 56, wherein the first storage device and the second storage device are part of a RAID, the RAID implementing a RAID level 0 configuration or a RAID level 1 configuration.

Statement 60. An embodiment of the disclosure includes the article according to statement 56, wherein the first storage device includes the decoder.

Statement 61. An embodiment of the disclosure includes the article according to statement 56, wherein:
the second storage device includes the decoder; and
processing the request using the first storage device includes transmitting the request from the decoder to the first storage device.

Statement 62. An embodiment of the disclosure includes the article according to statement 61, wherein the non-transitory storage medium has stored thereon further instructions that, when executed by the machine, result in processing the request using the second storage device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
a processor;
a first storage device supporting a cache coherent interconnect protocol, the cache coherent interconnect protocol including a block level protocol and a byte level protocol, the first storage device including a first address range;
a second storage device supporting the cache coherent interconnect protocol, the second storage device including a second address range, the second storage device providing a redundant array of independent disks (RAID) address range associated with the first address range and the second address range; and
a decoder associated with the second storage device, the decoder configured to receive a request from the processor, the request using the byte level protocol and including a byte address in the RAID address range, and to determine that the byte address in the RAID address range is associated with a target address range, wherein the first storage device and the second storage device are included in a RAID.

2. The system according to claim 1, wherein the processor is configured to build the RAID from the first storage device and the second storage device.

3. The system according to claim 2, wherein the processor is further configured to determine a stripe size for the RAID.

4. The system according to claim 3, wherein the processor is further configured to determine the stripe size for the RAID based at least in part on a block size.

5. The system according to claim 4, wherein the stripe size is a product of the block size and a number of storage devices in the RAID.

6. The system according to claim 4, wherein the decoder is configured to transmit the block size to the processor.

7. The system according to claim 1, wherein the decoder is further configured to determine that the byte address in the RAID address range is associated with the target address range based at least in part on a block size and a stripe size.

8. The system according to claim 1, wherein the decoder is further configured to generate a second byte address in the target address range based at least in part on the byte address, a block size, and a stripe size.

9. The system according to claim 1, wherein:
the RAID includes a RAID configuration;
the target address range includes the first address range;
the decoder is further configured to transmit the request to the first storage device; and
the first storage device is configured to execute the request.

10. The system according to claim 1, wherein:
the RAID includes a RAID configuration;
the request includes a store request;
the second storage device is configured to execute the store request;
the decoder is further configured to transmit the store request to the first storage device; and
the first storage device is configured to execute the store request.

11. The system according to claim 1, wherein:
the RAID includes a RAID configuration;
the request includes a load request; and
the decoder is further configured to transmit the load request to the first storage device; and
the first storage device is configured to execute the load request.

12. A method, comprising:
identifying a first storage device supporting a cache coherent interconnect protocol, the cache coherent interconnect protocol including a block level protocol and a byte level protocol, the first storage device including a first address range;
identifying a second storage device supporting the cache coherent interconnect protocol, the second storage device including a second address range;
building a redundant array of independent disks (RAID) from the first storage device and the second storage device;
generating a RAID address range based at least in part on the first address range and the second address range; and
configuring a decoder of the second storage device to process a request using the byte level protocol including a byte address in the RAID address range.

13. The method according to claim 12, wherein generating the RAID address range based at least in part on the first address range and the second address range includes generating the RAID address range based at least in part on the first address range, the second address range, and a stripe size.

14. The method according to claim 12, wherein configuring the decoder of the second storage device to process the request including the byte address in the RAID address range includes configuring the decoder of the second storage device to process the request based at least in part on the byte address, the RAID address range, a stripe size, and a block size.

15. A method, comprising:
receiving a request at a decoder from a processor, the request using a byte level protocol and including a byte address of a redundant array of independent disks (RAID) address range;
determining that the byte address is associated with a first address range of a first storage device; and processing the request using the first storage device, wherein the RAID address range is associated with the first address range of the first storage device and a second address range of a second storage device, the first storage device supports a cache coherent interconnect protocol, the cache coherent interconnect protocol including a block level protocol and the byte level protocol, and the second storage device supports the cache coherent interconnect protocol.

16. The method according to claim 15, wherein determining that the byte address is associated with the first address range of the first storage device includes generating a second byte address in the address range of the first storage device based at least in part on the byte address, a block size, and a stripe size.

17. The method according to claim 16, wherein generating the second byte address in the address range of the first storage device based at least in part on the byte address, the block size, and the stripe size includes generating the second byte address in the address range of the first storage device based at least in part on the byte address, the block size, and the stripe size, and a base address for the first address range.

18. The method according to claim 15, wherein the first storage device includes the decoder.

19. The method according to claim 15, wherein:
the second storage device includes the decoder; and
processing the request using the first storage device includes transmitting the request from the decoder to the first storage device.

20. The method according to claim 19, further comprising processing the request using the second storage device.

* * * * *